United States Patent [19]
Dundes, Sr.

[11] Patent Number: 5,871,257
[45] Date of Patent: Feb. 16, 1999

[54] SELF-LEVELING SEAT

[76] Inventor: Kenneth E. Dundes, Sr., 100 Commors Hollow Rd., Manchester, Ohio 45144

[21] Appl. No.: 997,934

[22] Filed: Dec. 24, 1997

[51] Int. Cl.$^6$ ................. B60N 2/52; B60N 2/54
[52] U.S. Cl. .................. 297/314; 297/313; 297/325; 297/344.19; 248/631
[58] Field of Search ................. 298/314, 313, 298/325, 344.19; 248/188.2, 188.3, 188.5, 631

[56] References Cited

U.S. PATENT DOCUMENTS

| | | | |
|---|---|---|---|
| 2,284,352 | 5/1942 | Zank | 297/314 X |
| 2,489,981 | 11/1949 | Rose | 297/314 X |
| 2,707,986 | 5/1955 | Johnson | 297/314 X |
| 4,057,213 | 11/1977 | Kokkila | 297/314 X |
| 4,095,770 | 6/1978 | Long | 297/314 X |
| 4,425,863 | 1/1984 | Cutter | 297/314 X |
| 4,500,062 | 2/1985 | Sandvik | 297/314 X |
| 4,626,018 | 12/1986 | Massey | 248/631 X |
| 4,636,001 | 1/1987 | Weyenberg | 297/614 |
| 4,749,228 | 6/1988 | Potter | 297/314 X |
| 5,570,929 | 11/1996 | Glockl | 297/313 |
| 5,702,083 | 12/1997 | Lai | 297/344.19 X |

*Primary Examiner*—Peter M. Cuomo
*Assistant Examiner*—Rodney B. White

[57] ABSTRACT

A self-leveling seat is provided including a vehicle having a seat with a horizontally oriented seat portion and a planar floor board. A tubular mounting frame includes a lower horizontal portion having a hollow cylindrical configuration. A pair of mounting brackets encompass the lower horizontal portion and are fixed to the floor board of the vehicle. A pair of upper vertical portions are each equipped with a hollow cylindrical configuration and have a bottom end connected to an associated end of the horizontal portion of the frame. The vertical portions extend upwardly therefrom to terminate at open top ends. The vertical portions are each in fluidic communication with the corresponding end of the horizontal portion. A pair of cylinders are each slidably situated within the top end of a corresponding one of the vertical portions of the frame and have a bottom end and a top end. The top end is coupled to a bottom surface of the seat portion of the seat. Lastly, a pneumatic assembly is situated within the horizontal portion for urging the cylinders upward in a eve orientation.

5 Claims, 3 Drawing Sheets

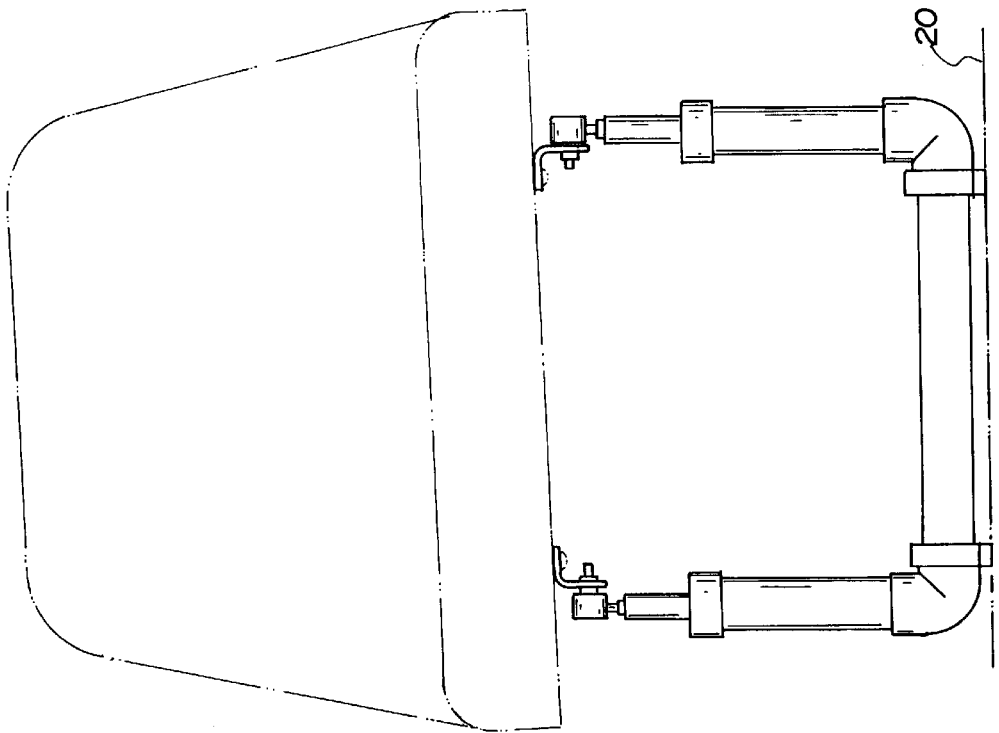
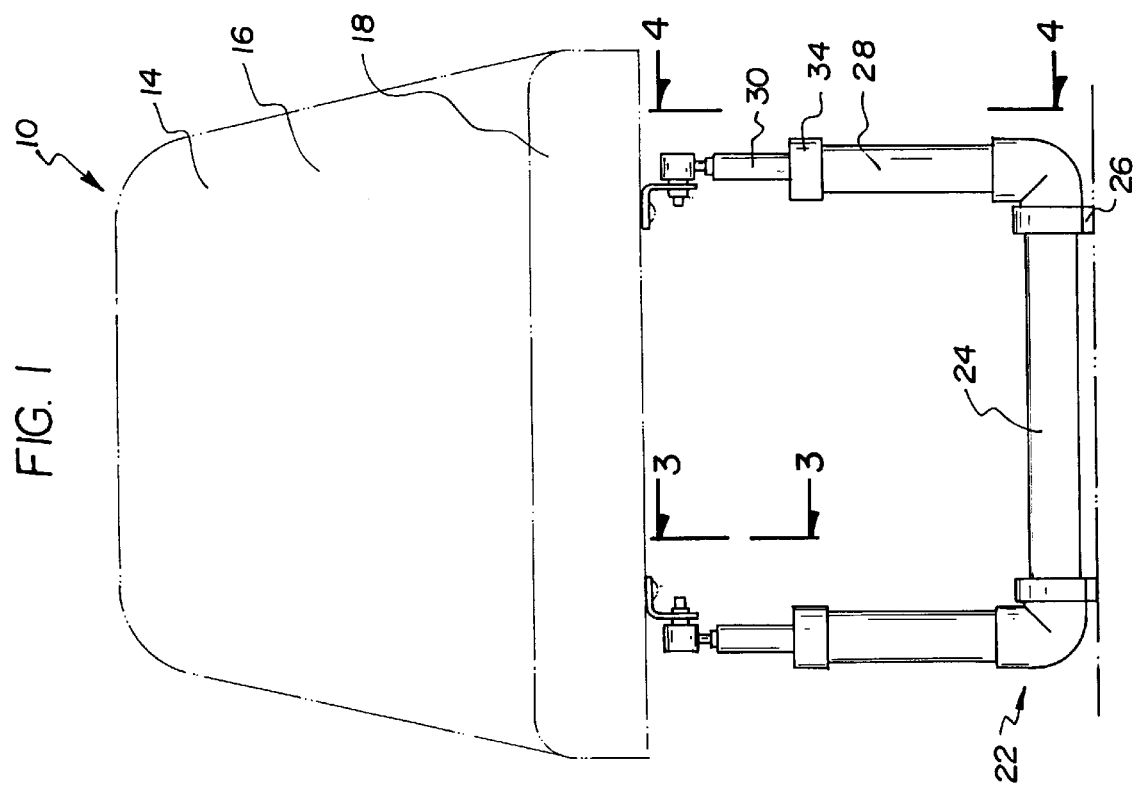

SELF-LEVELING SEAT

BACKGROUND OF THE INVENTION

1. Field of the Invention

The present invention relates to pivoting seats and more particularly pertains to a new self-leveling seat for maintaining a seat level when a vehicle is situated on an incline.

2. Description of the Prior Art

The use of pivoting seats is known in the prior art. More specifically, pivoting seats heretofore devised and utilized are known to consist basically of familiar, expected and obvious structural configurations, notwithstanding the myriad of designs encompassed by the crowded prior art which have been developed for the fulfillment of countless objectives and requirements.

Known prior art pivoting seats include U.S. Pat. No. 4,515,337; U.S. Pat. No. 4,022,411; U.S. Pat. No. 4,095,770; U.S. Pat. No. 5,372,347; U.S. Pat. No. 5,054,729; and U.S. Patent Des. 309,815.

In these respects, the self-leveling seat according to the present invention substantially departs from the conventional concepts and designs of the prior art, and in so doing provides an apparatus primarily developed for the purpose of maintaining a seat level when a vehicle is situated on an incline.

SUMMARY OF THE INVENTION

In view of the foregoing disadvantages inherent in the known types of pivoting seats now present in the prior art, the present invention provides a new self-leveling seat construction wherein the same can be utilized for maintaining a seat level when a vehicle is situated on an incline.

The general purpose of the present invention, which will be described subsequently in greater detail, is to provide a new self-leveling seat apparatus and method which has many of the advantages of the pivoting seats mentioned heretofore and many novel features that result in a new self-leveling seat which is not anticipated, rendered obvious, suggested, or even implied by any of the prior art pivoting seats, either alone or in any combination thereof.

To attain this, the present invention generally comprises a vehicle having a seat with a vertically oriented back rest portion and a horizontally oriented seat portion. As shown in FIGS. 1 & 2, the vehicle is equipped with a planar floor board. Next provided is a tubular mounting frame including a lower horizontal portion having a hollow cylindrical configuration. A pair of mounting brackets encompass an outer surface of ends of the lower horizontal portion. As shown in FIG. 4, the mounting brackets further have a planar bottom for being fixed to the floor board of the vehicle. Also included is a pair of upper vertical portions equipped with a hollow cylindrical configuration. A bottom end of each vertical portion is connected to an associated end of the horizontal portion of the frame. The vertical portions extend upwardly from the horizontal portion to terminate at open top ends. As shown in FIG. 5, the vertical portions are in fluidic communication with the corresponding end of the horizontal portion. A pair of cylinders are each slidably situated within the top end of a corresponding one of the vertical portions of the frame. A bottom end of each cylinder has a pair concentric bushings mounted to a periphery thereof. A top end of each cylinder has a vertical member of an angle bracket pivotally coupled thereto. As shown in FIGS. 1 & 2, horizontal members of the angle brackets extend toward each other and are coupled to a bottom surface of the seat portion of the seat. Finally, a pneumatic assembly is provided including a pair of valve members each having a disk-shaped configuration. Such valve members are situated within the horizontal portion of the tubular mounting frame. As shown in FIG. 5, each of the valve members has a cylindrical tab coupled in concentric relationship therewith. The pneumatic assembly further includes a spring situated between the valve members and coupled to the tabs thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new self-leveling seat apparatus and method which has many of the advantages of the pivoting seats mentioned heretofore and many novel features that result in a new self-leveling seat which is not anticipated, rendered obvious, suggested, or even implied by any of the prior art pivoting seats, either alone or in any combination thereof.

It is another object of the present invention to provide a new self-leveling seat which may be easily and efficiently manufactured and marketed.

It is a further object of the present invention to provide a new self-leveling seat which is of a durable and reliable construction.

An even further object of the present invention is to provide a new self-leveling seat which is susceptible of a low cost of manufacture with regard to both materials and labor, and which accordingly is then susceptible of low prices of sale to the consuming public, thereby making such self-leveling seat economically available to the buying public.

Still yet another object of the present invention is to provide a new self-leveling seat which provides in the apparatuses and methods of the prior art some of the advantages thereof, while simultaneously overcoming some of the disadvantages normally associated therewith.

Still another object of the present invention is to provide a new self-leveling seat for maintaining a seat level when a vehicle is situated on an incline.

Even still another object of the present invention is to provide a new self-leveling scat that includes a vehicle having a seat with a horizontally oriented seat portion and a planar floor board. A tubular mounting frame includes a lower horizontal portion having a hollow cylindrical configuration. A pair of mounting brackets encompass the lower horizontal portion and are fixed to the floor board of the vehicle. A pair of upper vertical portions are each equipped with a hollow cylindrical configuration and have a bottom end connected to an associated end of the horizontal portion of the frame. The vertical portions extend upwardly therefrom to terminate at open top ends. The vertical portions are each in fluidic communication with the corresponding end of the horizontal portion. A pair of cylinders are each slidably situated within the top end of a corresponding one of the vertical portions of the frame and have a bottom end and a top end. The top end is coupled to a bottom surface of the seat portion of the seat. Lastly, a pneumatic assembly is situated within the horizontal portion for urging the cylinders upward in a level orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front view of a new self-leveling seat according to the present invention.

FIG. 2 is another front view of the present invention.

DESCRIPTION OF THE PREFERRED EMBODIMENT

Figure 3:
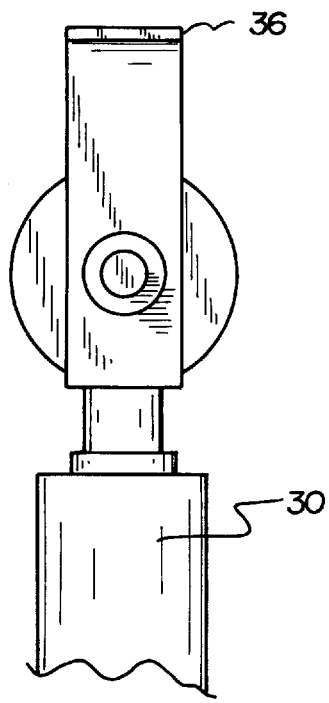
FIG. 3 is a side view of one of the angle brackets of the present invention.

With reference now to the drawings, and in particular to FIGS. 1 through 5 thereof, a new self-leveling seat embodying the principles and concepts of the present invention and generally designated by the reference numeral 10 will be described.

The present invention, designated as numeral 10, includes a vehicle having a seat 14 with a vertically oriented back rest portion 16 and a horizontally oriented seat portion 18. As shown in FIGS. 1 & 2, the vehicle is further equipped with a planar floor board 20.

Figure 4:
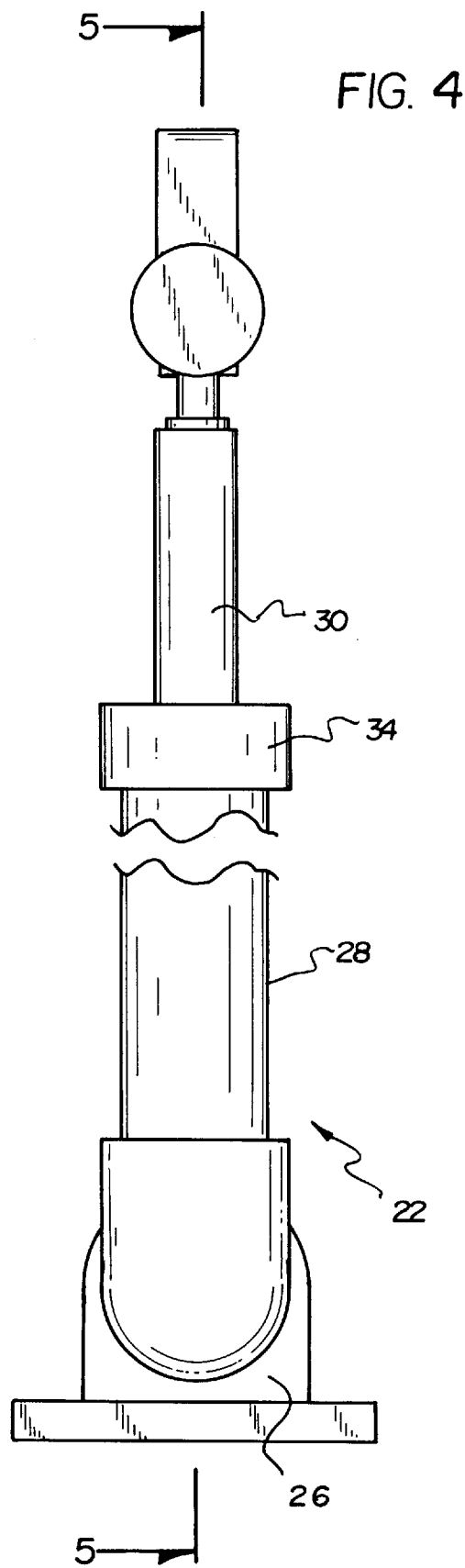
FIG. 4 is a side view of the present invention.
Figure 5:
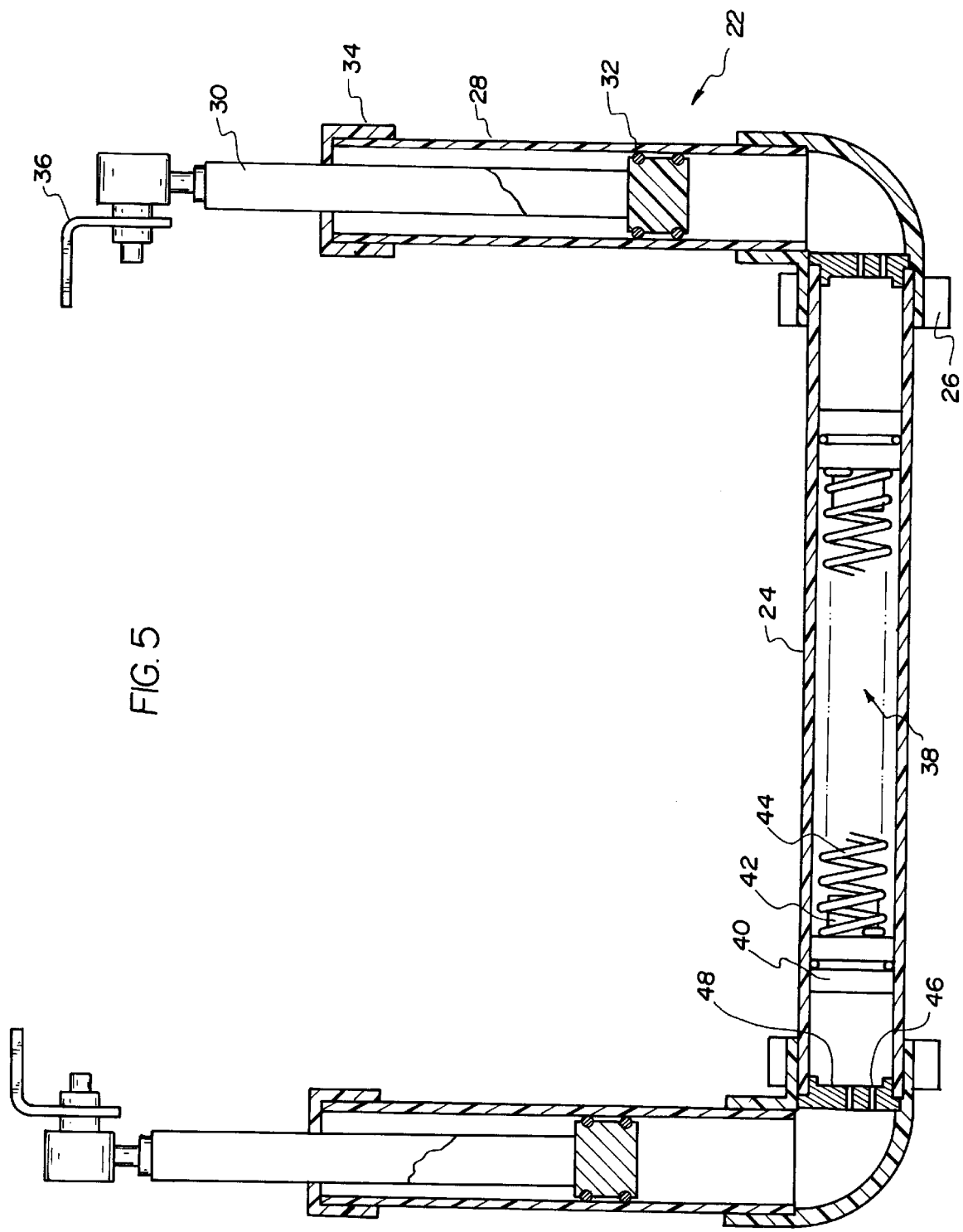
FIG. 5 is a cross-sectional view of the present invention taken along line 5—5 shown in FIG. 4.

Next provided is a tubular mounting frame 22 including a lower horizontal portion 24 having a hollow cylindrical configuration. A pair of mounting brackets 26 encompass an outer surface of ends of the lower horizontal portion. As shown in FIG. 4, the mounting brackets further have a planar bottom for being fixed to the floor board of the vehicle. Also included is a pair of upper vertical portions 28 each equipped with a hollow cylindrical configuration. A bottom end of each vertical portion is connected to an associated end of the horizontal portion of the frame via an elbow. The vertical portions extend upwardly from the horizontal portion to terminate at open top ends. As shown in FIG. 5, the vertical portions are in fluidic communication with the corresponding end of the horizontal portion. Further, the vertical portions and horizontal portion reside in a common vertical plane and, together, define a U-shaped configuration.

A pair of cylinders 30 are each slidably situated within the top end of a corresponding one of the vertical portions of the frame. As shown in FIG. 5, a length of the cylinders is approximately equal to that of the vertical portions of the tubular mounting assembly. A bottom end of each cylinder has a pair concentric bushings 32 mounted to a periphery thereof. A top end of each vertical portion of the tubular mounting assembly is preferably equipped with a cap 34 having a bore with a reduced diameter. The cap serves to maintain the cylinder vertically oriented.

A top end of each cylinder has a vertical member of an angle bracket 36 frictionally and pivotally coupled thereto. Alternatively, such coupling may be fixed. As shown in FIGS. 1 & 2, horizontal members of the angle brackets extend toward each other and are coupled to a bottom surface of the seat portion of the seat. In the alternative, the angle bracket may be fixed with respect to the corresponding cylinder. As an option, an additional joint or thick elastomeric bushing may be situated between the angle bracket and the seat to accommodate for the skewed angles between the bottom of the seat and the vertical cylinders.

Finally, a pneumatic assembly 38 is provided including a pair of valve members 40 each having a disk-shaped configuration. Such valve members are situated within the horizontal portion of the tubular mounting frame. As shown in FIG. 5, each of the valve members has a cylindrical tab 42 coupled in concentric relationship therewith. The pneumatic assembly further includes a spring 44 situated between the valve members and coupled to the tabs thereof. To prevent the valve members from exiting the horizontal member, a pair of brushings 48 are fixed therein adjacent to its ends. To preserve fluidic communication within the tubular mounting assembly, the stopper is provided with a plurality of bores 46.

By this structure, the valve members force the cylinders and the seat upward in a level orientation. Further, upon the vehicle being angled, the seat remains level. As an option, a limit switch may be situated within each of the vertical portions of the tubular mounting assembly and distanced below the top ends for generating a signal upon vehicle being angled beyond a predetermined amount. Such signal is preferably transmitted to an alarm which reacts by alerting a user of the orientation of the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A self-leveling seat system comprising, in combination:

a seat with a vertically oriented back rest portion and a horizontally oriented seat portion;

a tubular mounting frame including a lower horizontal portion having a hollow cylindrical configuration, a pair of mounting brackets encompassing an outer surface of ends of the lower horizontal portion and having a planar bottom for being fixed to a floor board of a vehicle, and a pair of upper vertical portions each with a hollow cylindrical configuration and having a bottom end connected to one end of the horizontal portion of the frame and extending upwardly therefrom to terminate at open top ends, wherein the vertical portions are each in fluidic communication with one end of the horizontal portion;

a pair of cylinders each slidably situated within the top end of one of the vertical portions of the frame with a bottom end having a pair of concentric bushings mounted to a periphery thereof and a top end having a vertical member of an angle bracket pivotally coupled thereto, wherein horizontal members of the angle brackets extend toward each other and are coupled to a bottom surface of the seat portion of the seat; and a pneumatic assembly including a pair of valve members each having a disk-shaped configuration and being situated within the horizontal portion of the tubular mounting frame, wherein each of the valve members has a cylindrical tab coupled in concentric relationship therewith, the pneumatic assembly further including a spring situated between the valve members and coupled to the tabs thereof, whereby the valve members force the cylinders and the seat upward in a level orientation and upon the vehicle being angled, the seat remains level.

2. A self-leveling seat support comprising:

a tubular mounting frame including a lower horizontal portion, a pair of mounting brackets encompassing the lower horizontal portion for being fixed to a floor board of a vehicle, and a pair of upper vertical portions each having a bottom end connected to one end of the horizontal portion of the frame and extending upwardly therefrom to terminate at open top ends, wherein the vertical portions are each in fluidic communication with one end of the horizontal portion;

a pair of cylinders each slidably situated within the top end of one of the vertical portions of the frame with a top end coupled to a bottom surface of a seat; and a pneumatic assembly situated within the horizontal portion for urging the cylinders upward in a level orientation.

3. A self-leveling seat as set forth in claim 2 wherein the pneumatic assembly includes a pair of valve members situated within the horizontal portion of the tubular mounting frame and separated via a spring.

4. A self-leveling seat as set forth in claim 2 wherein the valve members and cylinders are equipped with bushings for ensuring an air tight interconnection with the tubular frame assembly.

5. A self-leveling seat as set forth in claim 2 wherein the top ends of the cylinders are each mounted to the seat via an angle bracket which is pivotally coupled to the cylinder.

* * * * *